(12) United States Patent
Shi et al.

(10) Patent No.: US 11,962,982 B2
(45) Date of Patent: Apr. 16, 2024

(54) VIBRATION EXCITER FOR ELECTRONIC PRODUCT AND ELECTRONIC PRODUCT

(71) Applicant: GOERTEK INC., Shandong (CN)

(72) Inventors: Dezhang Shi, Shandong (CN);
Yongqiang Wang, Shandong (CN);
Dongsheng Mao, Shandong (CN);
Yueguang Zhu, Shandong (CN)

(73) Assignee: GOERTEK INC., Weifang (CN)

( * ) Notice: Subject to any disclaimer, the term of this patent is extended or adjusted under 35 U.S.C. 154(b) by 141 days.

(21) Appl. No.: 17/781,743

(22) PCT Filed: Jun. 30, 2020

(86) PCT No.: PCT/CN2020/099514
§ 371 (c)(1),
(2) Date: Jun. 2, 2022

(87) PCT Pub. No.: WO2021/109558
PCT Pub. Date: Jun. 10, 2021

(65) Prior Publication Data
US 2023/0007390 A1    Jan. 5, 2023

(30) Foreign Application Priority Data

Dec. 2, 2019   (CN) .......................... 201911213839.2

(51) Int. Cl.
*H04R 3/00*      (2006.01)
*H02K 33/12*    (2006.01)

(52) U.S. Cl.
CPC ............... *H04R 3/00* (2013.01); *H02K 33/12* (2013.01)

(58) Field of Classification Search
CPC .................................. H04R 3/00; H02K 33/12
(Continued)

(56) References Cited

U.S. PATENT DOCUMENTS

2020/0044538 A1*   2/2020   Tang ...................... H02K 33/18

FOREIGN PATENT DOCUMENTS

| CN | 106169855 A | 11/2016 |
|----|-------------|---------|
| CN | 106655698 A | 5/2017  |

(Continued)

OTHER PUBLICATIONS

International Search Report from International Application No. PCT/CN2020/099514 dated Sep. 29, 2020.

*Primary Examiner* — Sean H Nguyen
(74) *Attorney, Agent, or Firm* — Shih IP Law Group, PLLC

(57) ABSTRACT

A vibration exciter for an electronic product comprises a first vibration assembly comprising a first casing (101) and a magnetic circuit assembly below thereof; a second vibration assembly comprising a second casing (105) and at least two groups of coils (102) above thereof and on two sides of the magnetic circuit assembly; the magnetic circuit assembly comprises a central magnet (103b) and at least two side magnets (103a, 103b) in a vibration direction, the magnetizing directions of the two side magnets are parallel to an axial direction of the coils, directions of magnetic poles are opposite; the central magnet comprises at least two groups of magnets (103b, 1032b) in a direction perpendicular to the vibration direction, the magnetizing directions of the at least two groups of magnets are parallel to the vibration direction the directions of the magnetic poles are opposite. The electronic product is also disclosed.

9 Claims, 3 Drawing Sheets

(58) Field of Classification Search
USPC .......................................................... 381/337
See application file for complete search history.

(56) References Cited

FOREIGN PATENT DOCUMENTS

| | | |
|---|---|---|
| CN | 207251425 U | 4/2018 |
| CN | 109195085 A | 1/2019 |
| CN | 109309892 A | 2/2019 |
| CN | 208821074 U | 5/2019 |
| CN | 109842701 A | 6/2019 |
| CN | 110896267 A | 3/2020 |
| JP | 2017221905 A | 12/2017 |
| KR | 20130001426 A | 1/2013 |

* cited by examiner

VIBRATION EXCITER FOR ELECTRONIC PRODUCT AND ELECTRONIC PRODUCT

TECHNICAL FIELD

The present disclosure relates to a technical field of electro-acoustic conversion, in particular, to a vibration exciter for an electronic product and the electronic product.

BACKGROUND ART

The electronic product with a full screen is getting more and more attention. In order to increase a screen ratio, a front surface of the electronic product needs to be designed without holes, that is, hole structures such as a sound hole of an earpiece and a photosensitive hole of a camera needs to be eliminated.

The existing electromagnetic exciter generally comprises a stator, a vibrator and a housing. The stator comprises a coil. The vibrator comprises a permanent magnet and a mass block combined together. The vibrator is suspended in a cavity of a housing by an elastic sheet. The coil is fixed on an inner wall of the housing. However, such electromagnetic exciter has low magnetic field utilization rate and small driving force. Therefore, it is necessary to provide a new technical solution for solving the above technical problems.

SUMMARY OF THE INVENTION

One object of the present disclosure is to provide a vibration exciter for an electronic product and the electronic product.

According to a first aspect of the present disclosure, there is provided a vibration exciter for an electronic product. The vibration exciter comprises:
  a first vibration assembly comprising a first casing and a magnetic circuit assembly disposed below the first casing; and
  a second vibration assembly comprising a second casing and at least two groups of coils disposed above the second casing,
  wherein the at least two groups of coils are disposed on two sides of the magnetic circuit assembly,
  wherein the magnetic circuit assembly comprises a central magnet and at least two side magnets, the at least two side magnets are distributed parallel to a vibration direction, and the central magnet is disposed between the at least two side magnets,
  wherein magnetizing directions of the at least two side magnets are parallel to an axial direction of the coils, and directions of magnetic poles of the at least two side magnets are opposite, and
  wherein the central magnet comprises at least two magnets distributed in sequence perpendicular to the vibration direction, magnetizing directions of the at least two magnets are parallel to the vibration direction, and the directions of the magnetic poles of the adjacent magnets are opposite.

Optionally, the first casing comprises two first side walls disposed opposite to each other, and the second casing comprises two second side walls disposed opposite to each other; and
  wherein the first side walls and the second side walls are combined to form a space for accommodating the magnetic circuit assembly and the at least two groups of coils.

Optionally, a boss is provided on an inner bottom surface of the first casing, and the magnetic circuit assembly is fixedly connected to the boss, and
  wherein a side surface of the boss forms an overflow groove with the inner bottom surface of the first casing.

Optionally, a bottom wall of the second casing has a hollow structure;
  and/or the first casing is provided with a through hole thereon.

Optionally, the magnetic circuit assembly is embedded in the second vibration assembly, and the magnetic circuit assembly and the at least two groups of coils are disposed opposite to each other in a direction perpendicular to the vibration direction.

Optionally, the second vibration assembly further comprises a circuit board, and at least two groups of coils are electrically connected to the circuit board, and the circuit board is disposed above the second casing and is fixedly connected to the second casing.

Optionally, a connecting portion is extended out of the circuit board, a pad is provided on the connecting portion, and the pad is configured to be electrically connected to an external circuit.

Optionally, the magnetic circuit assembly and the first housing are fixed by bonding.

According to another aspect of the present disclosure, an electronic product is provided. The electronic product comprises:
  an electronic product body and a sound-generating component, the sound-generating component is vibratablely connected to the electronic product body;
  the vibration exciter, wherein the first vibration assembly is disposed on the electronic product body and the second vibration assembly is disposed on the sound-generating component, or wherein the first vibration assembly is disposed on the sound-generating component and the second vibration assembly is disposed on the electronic product body,
  wherein the vibration exciter is configured to drive the sound-generating component to vibrate with respect to the electronic product body to generate sound.

One technical effect of the present disclosure is that: the present disclosure discloses the vibration exciter for the electronic product, wherein density of magnetic induction lines generated by the magnetic circuit assembly of the present disclosure is more aggregated, thus more effective magnetic induction lines can pass through the coils, such that driving force of the vibration exciter is improved.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated in and constitute a part of the present specification, illustrate embodiments of the present disclosure and are used to explain the principles of the present disclosure together with the description thereof.

DETAILED DESCRIPTION OF THE EMBODIMENTS

Various exemplary embodiments of the present disclosure will now be described in detail with reference to the accompanying drawings. It should be noted that the relative arrangement, the numerical expressions and numerical values of components and steps set forth in these embodiments do not limit the scope of the present disclosure unless specifically stated otherwise.

The following description of at least one exemplary embodiment is actually merely illustrative and is in no way intended to limit the present disclosure, the application or use thereof.

Techniques, methods, and apparatus known to those of ordinary skill in the relevant art may not be discussed in detail, but in an appropriate case, such techniques, methods, and apparatus should be regarded as parts of the specification.

In all examples shown and discussed herein, any specific values should be construed as merely exemplary and not as limiting. Accordingly, other examples of the exemplary embodiment may have different values.

It should be noted that like numerals and letters refer to like items in the following drawings, therefore once an item is defined in one figure, it is no necessary to further explain in subsequent figures.

Figure 1:
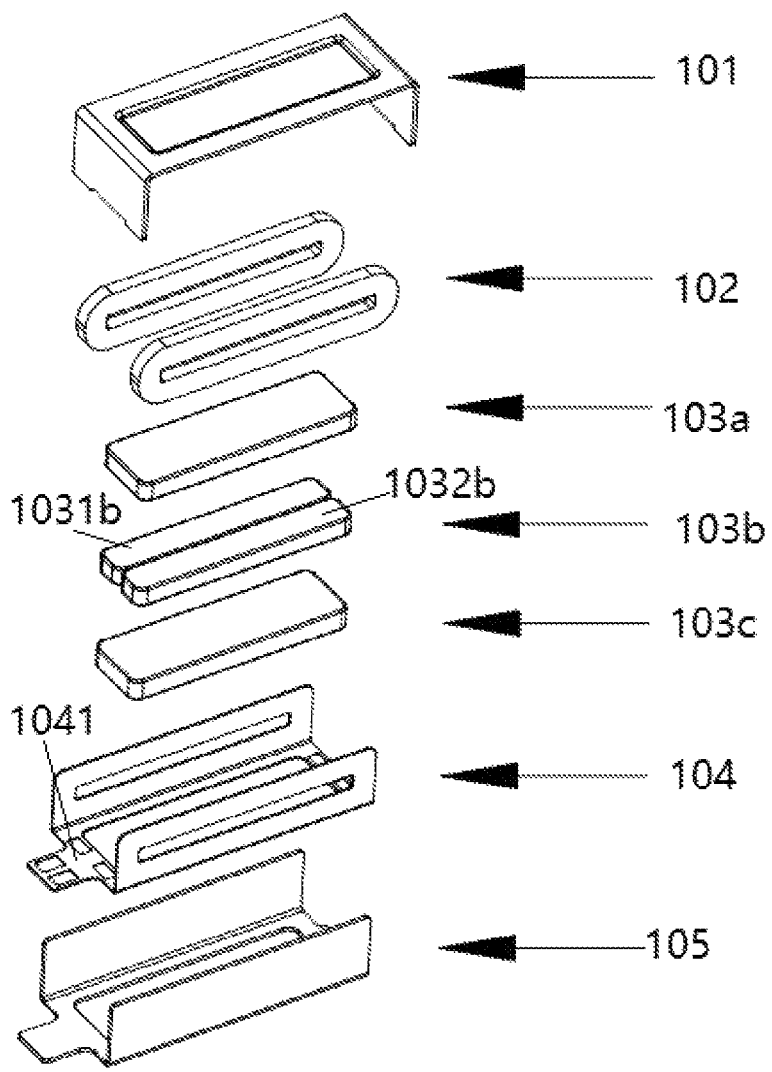
FIG. 1 is an exploded view illustrating a structure of a vibration exciter of the present disclosure.
Figure 2:
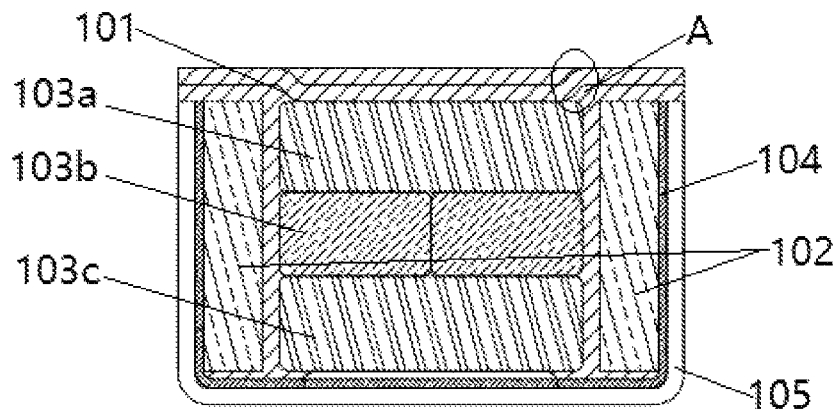
FIG. 2 is a left cross-sectional view illustrating the vibration exciter of the present disclosure.

According to an embodiment of the present disclosure, there is provided with a vibration exciter for an electronic product, as illustrated in FIG. 1 to FIG. 2, the vibration exciter comprises:

a first vibration assembly comprising a first casing 101 and a magnetic circuit assembly disposed below the first casing 101, wherein the first casing 101 is made of magnetically conductive material, on one hand, the first casing 101 protects the magnetic circuit assembly, and the first casing 101 can collect magnetic field and reduce leakage of magnetic field, and on the other hand, when the vibration exciter is applied to the electronic product, the first housing prevents the magnetic circuit assembly from being directly connected to the electronic product, and directly drives the electronic product to vibrate and generate sound by the vibration assembly; and a second vibration assembly comprising a second casing 105 and at least two groups of coils 102 disposed above the second casing 105, wherein the coils 102 in closed loops have axes themselves, in this embodiment, the axes of the coils are perpendicular to a vibration direction of the vibration exciter and in the meanwhile also parallel to directions of long sides of the first casing 101 and the second casing 105.

At least two groups of the coils 102 are disposed on two sides of the magnetic circuit assembly. In this embodiment, the coils 102 are disposed on two sides of the magnetic circuit assembly, such that closed magnetic induction lines generated by the magnetic circuit assembly can pass through the coils more effectively, and the driving force between the magnetic circuit assembly and the coils are greater. As illustrated in FIG. 2, the direction of a main body of the magnetic circuit assembly is parallel to long sides of the coils 102. The direction of the main body is an extending direction of the longest side of the magnetic circuit assembly. The long sides of the coils 102 are the sides of the coils 102 with the longest length. In this arrangement, an effective interaction area between the magnetic circuit assembly and the coils 102 is the largest, and the ampere force formed between the magnetic circuit assembly and the coils 102 is the largest.

The magnetic circuit assembly comprises a center magnet and at least two side magnets, the at least two side magnets are distributed parallel to the vibration direction, and the center magnet is disposed between the at least two side magnets.

In this embodiment, the magnetic induction lines generated by the center magnet and the magnetic induction lines generated by the side magnets can make the magnetic circuit to constitute a closed loop, so as to increase the effective utilization rate of the magnetic induction lines.

For example, the magnetic circuit assembly comprises a side magnet 103a and a side magnet 103c, wherein the side magnet 103a and the side magnet 103c constitute a first Halbach magnet.

For the center magnet 103b, at least two magnets are distributed in a direction perpendicular to the vibration direction. In this embodiment, the center magnet 103b comprises a magnet 1031b and a magnet 1032b, wherein the magnet 1031b and the magnet 1032b constitute a second Halbach magnet.

Therefore, this embodiment uses two groups of Halbach magnets with different magnetizing directions to constitute the magnetic circuit assembly of the present disclosure, wherein the magnetic induction lines generated by the center magnet 103b and the magnetic induction lines generated by the side magnets 103a and 103c form a closed magnetic induction lines which passes through the coils. In this embodiment, the magnetic circuit assembly has a higher density of the magnetic field, a higher utilization rate of the magnetic field and a larger driving force, the ampere force applied on the coils can be larger and more balanced, and the vibration assembly can vibrate more stable, more intense and starts to vibrate faster.

The magnetizing directions of the at least two side magnets are parallel to the axial directions of the coils, and the directions of magnetic poles of the at least two side magnets are opposite. The center magnet comprises at least two magnets distributed in sequence in a direction in perpendicular to the vibration direction, magnetizing directions of the at least two magnets are parallel to the vibration direction, and the directions of the magnetic poles of the adjacent magnets are opposite.

Figure 3:
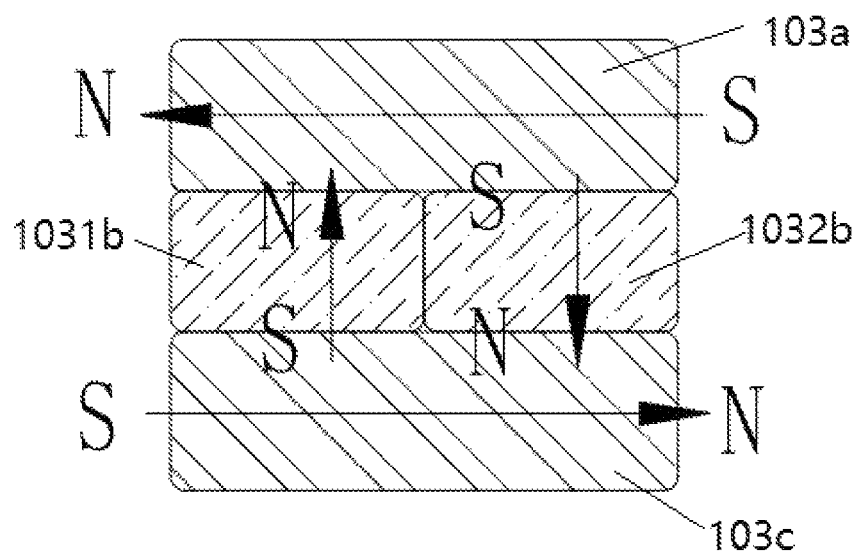
FIG. 3 is a schematic diagram illustrating magnetizing directions of magnets in a magnetic circuit assembly of the present disclosure.

As illustrated in FIG. 3, a left end of the side magnet 103a located at a uppermost side is a N pole, and a right end thereof is a S pole. The magnetizing direction of the side magnet 103a is perpendicular to the vibration direction of the vibration exciter, and the coils 102 are located on two sides of the magnetic circuit assembly. When powered on, the coils are subjected to ampere force parallel to the vibration direction. A left end of the magnet 103c located at a lowermost side is a S pole, and a right end thereof is a N pole. The magnetizing direction of the side magnet 103c is perpendicular to the vibration direction of the vibration exciter, and the coils 102 are located on two sides of the magnetic circuit assembly. When powered on, the coils are subjected to the ampere force parallel to the vibration direction.

The center magnet comprises magnets 1031b and 1032b which are distributed side by side and are magnetized in a longitudinal direction, wherein one end of the magnet 1031b adjacent to the side magnet 103c is an S pole, and another end of the magnet 1031b far from the side magnet 103c is an N pole, the magnetizing direction of the magnet 1031b is parallel to the vibration direction. One end of the magnet 1032b adjacent to the side magnet 103c is an N pole, and another end of the magnet 1032b far from the side magnet 103c is an S pole, the magnetizing direction of the magnet 1032b is parallel to the vibration direction, wherein the magnetic induction lines generated by the side magnet 103a, the side magnet 103c, the magnet 1031b, and the magnet 1032b respectively can form closed magnetic induction lines, such that the magnetic circuit assembly forms a closed magnetic circuit, so as to increase the effective utilization rate of the magnetic induction lines.

Optionally, in the magnetic circuit assembly, the side magnets and the center magnet are fixed by bonding.

In this embodiment, the magnetic circuit assembly comprises the first Halbeck magnet and the second Halbeck magnet, wherein the first Halbeck magnet and the second Halbeck magnet are arranged to intersect with each other. For example, in the present embodiment, the second Halbach magnet formed by the central magnet is disposed in the first Halbach magnet. In this embodiment, the magnetic circuit assembly forms a magnetic field enhancing region, and the coils are located in the magnetic field enhancing region. Compared with general magnets, the magnetic circuit assembly of the present disclosure has higher magnetic field density, higher magnetic field utilization rate, and larger driving force, and the ampere force applied on the coils 102 can be larger and more balanced, and the vibration assembly can vibrate more stable, more intense and starts to vibrate faster.

Obviously, the magnetic circuit assembly is not limited to the above embodiment, and those skilled in the art can choose the magnetic circuit assembly according to actual needs.

Optionally, the first casing 101 comprises two first side walls disposed opposite to each other, and the second casing 105 comprises two second side walls disposed opposite to each other;

The first side walls and the second side walls are combined to form a space for accommodating the magnetic circuit assembly and the at least two groups of coils. In this embodiment, the first side walls and the second side walls can receive the magnetic circuit assembly and the coils, and in the meanwhile also prevent leakage of the magnetic field. On the other hand, when the vibration exciter is applied to electronic product, the first casing 101 and the second casing 105 are formed with a larger connection surface therebetween, such that the connection between the vibration exciter and the electronic product are more firm and more convenient.

Optionally, an inner bottom surface of the first casing 101 is provided with a boss, and the magnetic circuit assembly is fixedly connected to the boss; and the side surface of the boss forms an overflow slot A with the inner bottom surface of the first casing.

The inner bottom surface of the first casing 101 is provided with the boss extending towards a direction close to the second vibration assembly. The boss may be formed by punching the first casing 101, or the boss may be integrally formed with the first casing 101, or the boss and the first casing 101 may be separate structures, which is not particularly limited by the present disclosure. As illustrated in FIG. 2, the inner bottom surface of the first casing 101 is recessed downward to form the boss, wherein the magnetic circuit assembly is fixedly connected to the boss. For example, the magnetic circuit assembly is connected to the boss by bonding, and both of the surface of the boss adjacent to the magnet assembly and the surface of the magnetic circuit assembly adjacent to the boss are provided with adhesive and are bonded and fixed under an applied force. For example, in the case that the adhesive force is increased by pressing, the excess adhesive may move along the direction of the overflow groove A, so as to prevent the adhesive from flowing to an end surface adjacent to the coils 102 along the structure of the magnetic circuit assembly which affecting the magnetic force action of the magnetic circuit assembly.

Optionally, a bottom wall of the second casing 105 has a hollow structure; and/or an upper surface of the first casing 101 is provided with a through hole thereon. In this embodiment, the bottom wall of the second casing 105 has a hollow structure, and the hollow structure is configured to form an escape space. After the second casing 105 forming the escape space, the coils and the magnetic circuit assembly can be prevented from directly colliding with the second casing 105 during the vibration process which affecting the vibration effect.

The upper surface of the first casing 101 is provided with the through hole, for example, the through hole penetrates through the upper surface of the first casing 101 and in the meanwhile penetrates through the boss formed on the inner bottom surface of the first casing 101. In this embodiment, the first casing 101 is provided with the through hole, and the through hole is configured to form an escape space. After the first casing 101 forming the escape space, the coils and the magnetic circuit assembly can be prevented from directly colliding with the second casing 105 during the vibration process which affecting the vibration effect.

Optionally, the magnetic circuit assembly is embedded in the second vibration assembly, and the magnetic circuit assembly and the at least two groups of coils are disposed opposite to each other in a direction perpendicular to the vibration direction. In this embodiment, the first vibration assembly and the second vibration assembly are separated by a certain vibration space, and the magnetic circuit assembly is embedded between the two groups of coils. In this embodiment, the magnetic circuit assembly makes the density of the magnetic field to be highly aggregated, and in the meanwhile, the coils are located in an area where the density of the magnetic field is highly aggregated, such that the magnetic field utilization efficiency is higher and a stronger driving force can be provided under the same voltage, and the vibration exciter can vibrate more stable, more intense and starts to vibrate faster.

Optionally, the second vibration assembly further comprises a circuit board 104, and the at least two groups of coils 102 are electrically connected to the circuit board 104. The circuit board 104 is disposed above the second casing 105 and is fixedly connected to the second housing 105. In this embodiment, the structure of the circuit board 104 and the structure of the second casing 105 are matched with each other, for example, the circuit board 104 also forms two side walls, wherein the side walls are provided with through holes, and the shapes of the through holes and the structures of the coils are matched with each other. For example, the through holes have racetrack-like structures, and the through holes are configured to provide spaces for the coils to vibrate. The circuit board and the second casing are fixed by bonding.

Optionally, a connecting portion is extended out of the circuit board, and the connecting portion is provided with a pad, and the pad is configured to be electrically connected to an external circuit. Thus, in this embodiment, it is convenient to detect the performance of the vibration exciter.

Optionally, the at least two groups of coils are connected by the combination of a series connection and a parallel connection, for example, one group of coils, two groups of coils or a plurality of groups of coils are respectively provided on each side of the magnetic circuit assembly. For example, after the coils on the same side are connected in series, they are connected in parallel with the coils on the opposite side; or after the coils on the same side are connected in parallel, they are connected in series with the coils on the opposite side. In this embodiment, after the coils are powered on, more effective magnetic induction lines can pass through the coils to increase the driving force of the system under the premise of ensuring the effective utilize length of the coils remain unchanged.

According to another aspect of the present disclosure, there is provided with an electronic product. The electronic product comprises:

an electronic product body and a sound-generating component, the sound-generating component is vibratablely connected to the electronic product body;

the above vibration exciter, the first vibration assembly is disposed on the electronic product body and the second vibration assembly is disposed on the sound-generating component, or the first vibration assembly is disposed on the sound-generating component and the second vibration assembly is disposed on the electronic product body, wherein the vibration exciter is configured to drive the sound-generating component to vibrate with respect to the electronic product body to generate sound.

Figure 4:
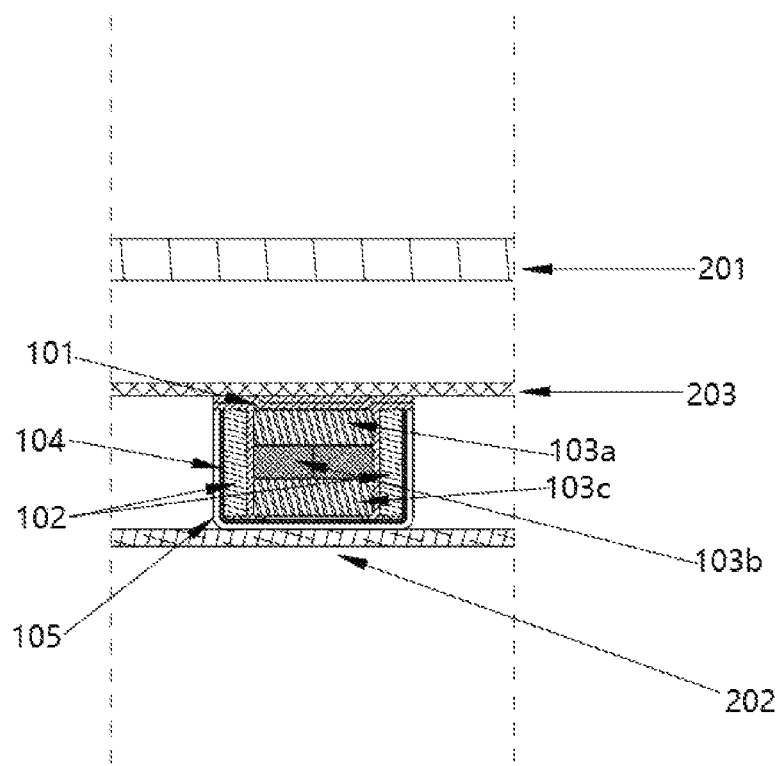
FIG. 4 is a schematic diagram illustrating a structure that the vibration exciter of the present disclosure is applied to an electronic product.

As illustrated in FIG. 4, the sound-generating component may be a screen 202, and the screen 202 is provided on the electronic product and is used as a display screen of the electronic product. The screen 202 can be configured that one end can be rotatably connected to the electronic product and the other end can be freely moved; or the screen 202 can be made by material having good elastic deformability, and the screen 202 is configured that one end is fixedly connected to other fixed components and the other end can be freely moved. In this way, the screen 202 can vibrate with respect to the electronic product body. A part structure of the electronic product body can be used as a fixing member 203, and the vibration exciter is disposed in the electronic product body.

Optionally, the fixing member 203 may be structures such as a middle frame, a PCB, and a side wall in the electronic product body. A rear cover 201 is provided on a side of the fixing member 203 opposite to the screen 202. These structural components have good structural stability in the electronic product, and are used to install the electronic product and protect the electronic product.

Since the electronic product provided by the present disclosure uses the vibration exciter provided by the present disclosure, the electronic product occupies less space in a direction parallel to a thickness direction of the screen 202, which is more beneficial to make the electronic product thinner to satisfy the design requirements for making the electronic product thin and lightweight.

While some specific embodiments of the present disclosure have been described in detail by way of examples, those skilled in the art will appreciate that the above examples are intended to be illustrative only and not intended to limit the scope of the present disclosure. Those skilled in the art will appreciate that modifications may be made to the above embodiments without departing from the scope and spirit of the present disclosure. The scope of the present disclosure is defined by the appended claims.

What is claimed is:

1. A vibration exciter for an electronic product, the vibration exciter comprising:

a first vibration assembly comprising a first casing and a magnetic circuit assembly disposed below the first casing; and a second vibration assembly comprising a second casing and at least two groups of coils disposed above the second casing, wherein the at least two groups of coils are disposed on two sides of the magnetic circuit assembly, wherein the magnetic circuit assembly comprises a central magnet and at least two side magnets, the at least two side magnets are distributed parallel to a vibration direction, and the central magnet is disposed between the at least two side magnets, wherein magnetizing directions of the at least two side magnets are parallel to an axial direction of the coils, and directions of magnetic poles of the at least two side magnets are opposite, and wherein the central magnet comprises at least two magnets distributed in sequence perpendicular to the vibration direction, magnetizing directions of the at least two magnets are parallel to the vibration direction, and the directions of the magnetic poles of the adjacent magnets are opposite.

2. The vibration exciter of claim 1, wherein the first casing comprises two first side walls disposed opposite to each other, and the second casing comprises two side walls disposed opposite to each other; and wherein the first side walls and the second side walls are combined to form a space for accommodating the magnetic circuit assembly and the at least two groups of coils.

3. The vibration exciter of claim 1, wherein a boss is provided on an inner bottom surface of the first casing, and the magnetic circuit assembly is fixedly connected to the boss, and wherein a side surface of the boss forms an overflow groove with the inner bottom surface of the first casing.

4. The vibration exciter of claim 1, wherein a bottom wall of the second casing has a hollow structure; and/or wherein the first casing is provided with a through hole thereon.

5. The vibration exciter of claim 1, wherein the magnetic circuit assembly is embedded in the second vibration assembly, and the magnetic circuit assembly and the at least two groups of coils are disposed opposite to each other in a direction perpendicular to the vibration direction.

6. The vibration exciter of claim 1, wherein the second vibration assembly further comprises a circuit board, the at least two groups of coils are electrically connected to the circuit board, and the circuit board is disposed above the second casing and is fixedly connected to the second casing.

7. The vibration exciter of claim 6, wherein a connecting portion is extended out of the circuit board, a pad is provided on the connecting portion, and the pad is configured to be electrically connected to an external circuit.

8. The vibration exciter of claim 1, wherein the magnetic circuit assembly and the first housing are fixed by bonding.

9. An electronic product, comprising:

an electronic product body and a sound-generating component, the sound-generating component is vibratablely connected to the electronic product body;

the vibration exciter according to claim 1, wherein the first vibration assembly is disposed on the electronic product body and the second vibration assembly is disposed on the sound-generating component, or wherein the first vibration assembly is disposed on the sound-generating component and the second vibration assembly is disposed on the electronic product body, wherein the vibration exciter is configured to drive the sound-generating component to vibrate with respect to the electronic product body to generate sound.

\* \* \* \* \*